United States Patent
Din et al.

(10) Patent No.: US 9,731,452 B2
(45) Date of Patent: Aug. 15, 2017

(54) THREE DIMENSIONAL PRINTER AND METHOD FOR ADJUSTING WORKING COORDINATE OF PLATFORM THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Yang-Teh Lee, New Taipei (TW); Kwan Ho, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 587 days.

(21) Appl. No.: 14/178,273

(22) Filed: Feb. 12, 2014

(65) Prior Publication Data
US 2015/0057781 A1  Feb. 26, 2015

Related U.S. Application Data

(60) Provisional application No. 61/869,079, filed on Aug. 23, 2013.

(30) Foreign Application Priority Data

Nov. 8, 2013 (TW) .............................. 102140700 A

(51) Int. Cl.
*G06F 19/00* (2011.01)
*B29C 67/00* (2017.01)
(Continued)

(52) U.S. Cl.
CPC ...... *B29C 67/0088* (2013.01); *G05B 19/4086* (2013.01); *B33Y 30/00* (2014.12); *G05B 2219/33257* (2013.01)

(58) Field of Classification Search
None
See application file for complete search history.

(56) References Cited

U.S. PATENT DOCUMENTS 7,448,730 B2 * 11/2008 Hirayama ............ B41J 2/04541
347/12
7,680,555 B2 3/2010 Dunn et al.
(Continued)

FOREIGN PATENT DOCUMENTS

CN 101460290 6/2009
TW 446682 7/2001

*Primary Examiner* — Diem Cao
(74) *Attorney, Agent, or Firm* — Jianq Chyun IP Office

(57) ABSTRACT

A three-dimensional (3-D) printer and a method for adjusting a working coordinate of a platform thereof are provided. The 3-D printer includes a platform, a printing head and a control unit. The platform includes a carrying surface and adjustment points located on the carrying surface. The printing head disposed above the platform for moving along a datum plane and a normal direction of the datum plane. The control unit controls the printing head to move from the datum plane toward the platform to contact each of the adjustment points for obtaining a coordinate offset of the carrying surface corresponding to the datum plane, and adjusts a model coordinate of a digital 3-D model information according to the coordinate offset. The control unit moves the printing head according to the adjusted model coordinate to print a 3-D object related to the digital 3-D model information on the carrying surface.

8 Claims, 6 Drawing Sheets

(51) Int. Cl.
*G05B 19/408* (2006.01)
*B33Y 30/00* (2015.01)

(56) References Cited

U.S. PATENT DOCUMENTS

| | | | | |
|---|---|---|---|---|
| 2007/0228592 A1* | 10/2007 | Dunn | ................ | B29C 67/0055 |
| | | | | 264/40.4 |
| 2013/0073073 A1* | 3/2013 | Pettis | ................ | B29C 67/0085 |
| | | | | 700/119 |
| 2013/0095302 A1* | 4/2013 | Pettis | ................ | B32B 3/10 |
| | | | | 428/195.1 |
| 2013/0327917 A1* | 12/2013 | Steiner | ................ | F16M 13/022 |
| | | | | 248/649 |

* cited by examiner

THREE DIMENSIONAL PRINTER AND METHOD FOR ADJUSTING WORKING COORDINATE OF PLATFORM THEREOF

CROSS-REFERENCE TO RELATED APPLICATION

This application claims the priority benefits of U.S. provisional application Ser. No. 61/869,079, filed on Aug. 23, 2013 and Taiwan application serial no. 102140700, filed on Nov. 8, 2013. The entirety of each of the above-mentioned patent applications is hereby incorporated by reference herein and made a part of this specification.

TECHNICAL FIELD

The technical field relates to a printer and a method for adjusting a working coordinate of a platform; more particularly, to a three-dimensional (3-D) printer and a method for adjusting a working coordinate of a platform thereof.

DESCRIPTION OF RELATED ART

With the advance in computer-aided manufacturing (CAM), the manufacturing industry has developed a three-dimensional (3-D) printing technology to rapidly convert original design concept into physical objects. The 3-D printing technology is actually a general designation of a series of rapid prototyping (RP) techniques. A basic principle thereof is an additive manufacturing by using a RP machine to form a sectional shape of a workpiece in an X-Y plane through scanning, and to intermittently shift by a layer thickness along a Z-axis, so as to finally form a 3-D object. The 3-D printing technology is not limited to any geometric shape, and the more complex the components are, the more excellent the RP technology is demonstrated. The 3-D printing technology may greatly save manpower and processing time. With a demand of shortest time, a digital 3-D model designed by using a 3-D computer-aided design (CAD) software may be truthfully presented as touchable. Furthermore, a geometric curve of the digital 3-D model could be truthfully appreciated. Moreover, assembly ability of components thereof may be tested and even functions thereof may possibly be tested.

In general, a current 3-D printer usually reads a digital 3-D model to build a 3-D object associated with the digital 3-D model accordingly by using the aforesaid RP techniques to form 3-D objects. However, a platform configured for carrying built substrates in the 3-D printer may gradually skewed in comparison with a horizontal plane as time goes by, while coordinates of a digital 3-D model are not modified, such that a printing head still stacks the built substrates on the platform according to original plane coordinates. Consequently, a printed 3-D object does not meet actual expectations, and quality and yield of printing of the 3-D printer is adversely affected.

SUMMARY

One of exemplary embodiment provides a three-dimensional (3-D) printer and a method for adjusting a working coordinate of a platform thereof, such that a skewed platform may be adjusted without manually adjusting the position of the platform.

The 3-D printer of the exemplary embodiment includes a platform, a printing head and a control unit. The platform includes a carrying surface and a plurality of adjustment points located on the carrying surface. The printing head is disposed above the platform and is configured to move along a datum plane and a normal direction of the datum plane. The control unit controls the printing head to move from the datum plane toward the platform to be in contact with adjustment points respectively for obtaining a plane coordinate of each of the adjustment points corresponding to the datum plane and a shortest distance from each of the adjustment points to the datum plane, obtaining a coordinate offset of the carrying surface corresponding to the datum plane according to the plane coordinate and the shortest distance, and adjusting a model coordinate of a digital 3-D model information according to the coordinate offset. The control unit moves the printing head according to the adjusted model coordinate to print a 3-D object related to the digital 3-D model information on the carrying surface.

A method for adjusting a working coordinate of a platform in the exemplary embodiment is suitable for a platform including a carrying surface and a plurality of adjustment points. The adjustment points are located on the carrying surface. The method includes the following steps. First of all, a moving part is controlled to move from a datum plane toward the carrying surface respectively to be in contact with the adjustment points. Next, a plane coordinate of each of the adjustment points corresponding to the datum plane and a shortest distance from each of the adjustment points to the datum plane are calculated for obtaining a coordinate offset of the carrying surface corresponding to the datum plane according to the plane coordinates and the shortest distances. Afterwards, a working coordinate of a task to be executed by the platform is adjusted according to the coordinate offset.

In view of the foregoing, before performing a printing task, the 3-D printer of the disclosure is suitable for first controlling the printing head thereof to move from the datum plane toward the platform respectively to be in contact with the plurality of adjustment points, so as to obtain a coordinate offset of the carrying surface of the platform corresponding to the datum surface, and to adjust a model coordinate of the digital 3-D model information according to the coordinate offset, such that the printing head is moved according to the adjusted model coordinate to print out a 3-D object related to the digital 3-D model information. In this way, the printing head may be shifted to correct working coordinates according to the adjusted model coordinates, and a yield and a precision in printing 3-D objects would not be affected by deviation of the platform. Namely, in the disclosure, the model coordinates of the digital 3-D model information is adjusted accordingly by calculating the coordinate offsets of the carrying surface corresponding to the datum plane so as to compensate the deviation of the platform.

Moreover, in the disclosure, a method for adjusting a working coordinate of a platform is further derived. The method executes a task by first controlling a moving part to move from a datum plane toward a platform respectively to be in contact with a plurality of adjustment points on the platform for obtaining a coordinate offset of the carrying surface of the platform corresponding to the datum plane, and then adjusting a working coordinate of a task to be executed by the platform according to the coordinate offset. In this way, with the adjusting method in the disclosure, the moving part may execute a task by shifting to correct working coordinates according to the adjusted model coordinates without manually adjusting the level of the platform, and a yield and a precision in executing the task would not be affected by deviation of the platform. As such, in the disclosure, effects of adjusting the deviation of the platform may be achieved without manually adjusting the level of the platform.

To make the aforesaid features and advantages of the disclosure more comprehensible, several embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

It is to be understood that the foregoing and other detailed descriptions, features, and advantages are intended to be described more comprehensively by providing each embodiment accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the disclosure. Additionally, same or similar reference numbers used in each of the embodiments represent the same or similar elements.

Figure 1:
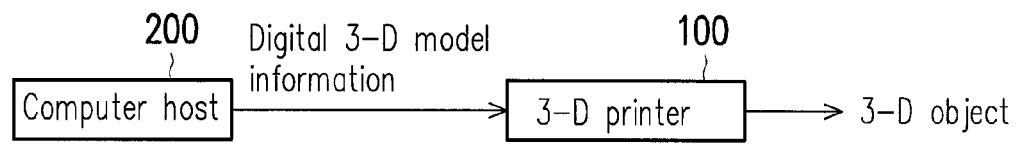
FIG. 1 is a block diagram illustrating an operation condition of a three-dimensional (3-D) printer according to an exemplary embodiment.

FIG. 1 is a block diagram illustrating an operation condition of a three-dimensional (3-D) printer according to an exemplary embodiment. With reference to FIG. 1, a three-dimensional (3-D) printer 100 of the present embodiment is suitable for printing a 3-D object according to a digital 3-D model information. In the present embodiment, the digital 3-D model information may be a 3-D digital image file, and the 3-D digital image file may be formed by, for example, a computer-aided design (CAD) or a 3-D modeling and animation software of a computer host 200. In addition, the digital 3-D model information is sliced into a plurality of cross-sectional information for the 3-D printer 100 to fabricate a plurality of 3-D cross-sectional layers sequentially according to the cross-sectional information of the digital 3-D model information. The 3-D cross-sectional layers are stacked upon one another to form the 3-D object.

Figure 2:
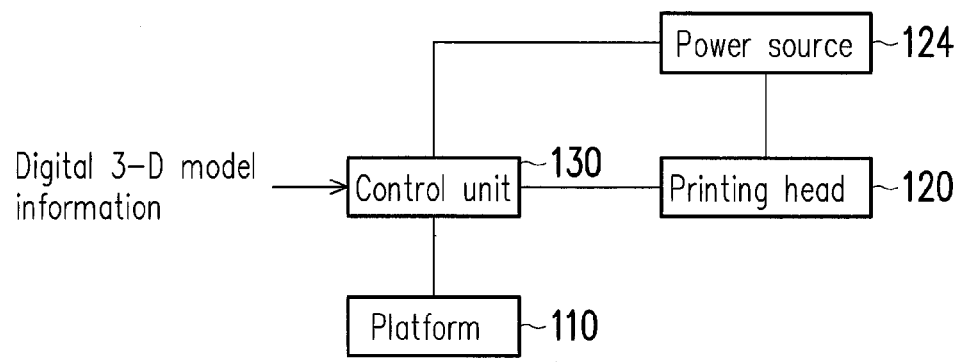
FIG. 2 is a block diagram illustrating a 3-D printer according to an exemplary embodiment.
Figure 3A:
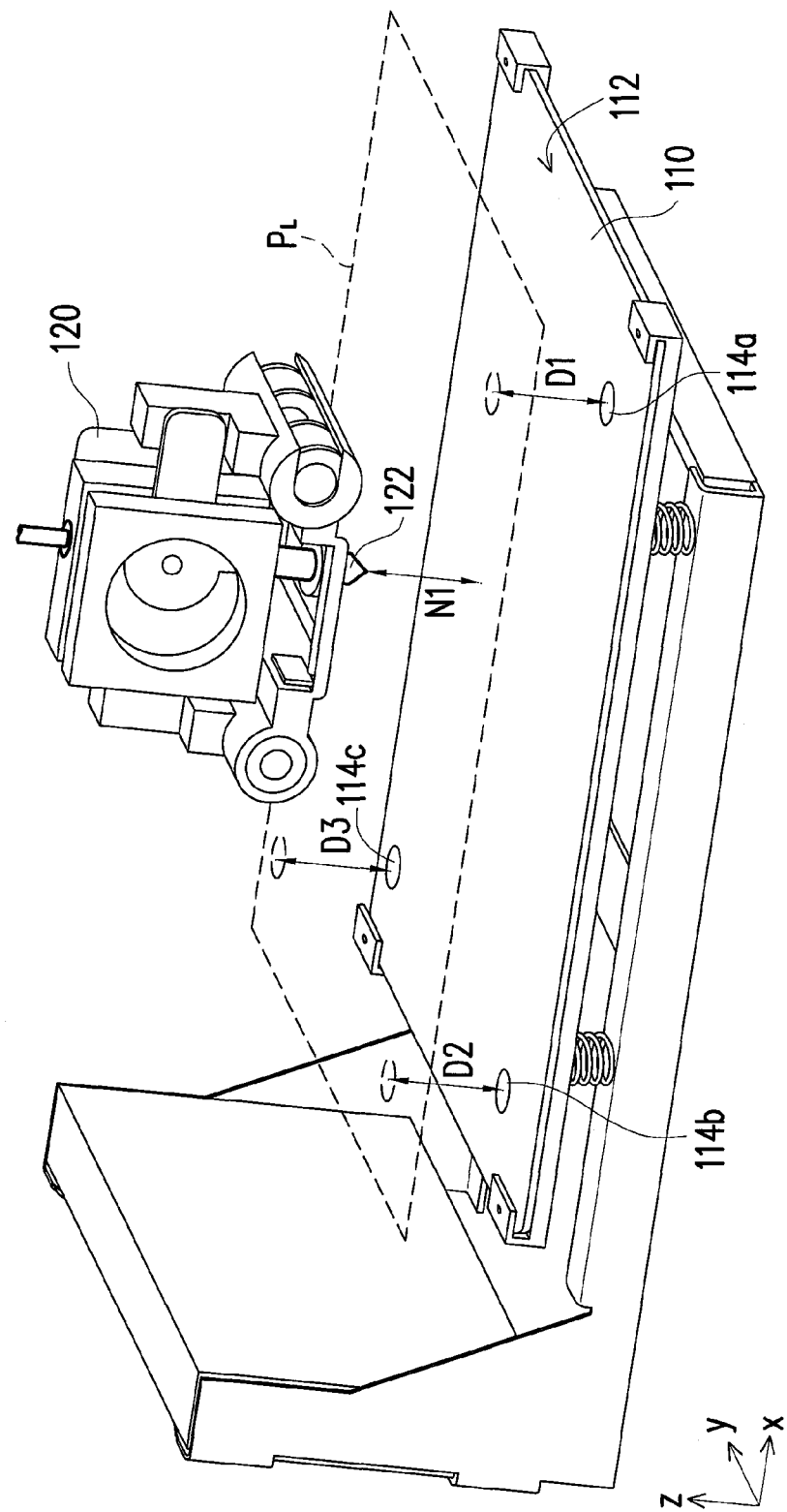
FIG. 3A is a schematic diagram illustrating a 3-D printer according to an exemplary embodiment.

FIG. 2 is a block diagram illustrating a 3-D printer according to an exemplary embodiment. FIG. 3A is a schematic diagram illustrating a three-dimensional (3-D) printer according to an exemplary embodiment. With reference to FIG. 2 and FIG. 3A together, the 3-D printer 100 of the present embodiment includes a platform 110, a printing head 120 and a control unit 130. The platform 110 includes a carrying surface 112 and a plurality of adjustment points 114a, 114b and 114c located on the carrying surface 112. The printing head 120 is disposed above the platform 110, and is configured to move along a datum plane $P_L$ and a normal direction N1 of the datum plane $P_L$. The control unit 130 is coupled to the platform 110 and the printing head 120 respectively, and controls the printing head 120 to move from positions at the datum plane $P_L$ corresponding to the adjustment points 114a, 114b and 114c (the positions marked in dotted circles on the datum plane $P_L$ as shown in FIG. 3A) toward the platform 110 along the normal direction N1 to be in contact with the adjustment points 114a, 114b and 114c respectively for obtaining plane coordinates of the adjustment points 114a, 114b and 114c corresponding to the datum plane $P_L$ and shortest distances D1, D2 and D3 from the adjustment points 114a, 114b and 114c to the datum plane $P_L$.

Specifically, the control unit 130 may, for example, control the printing head 120 first to move to the position at the datum plane $P_L$ corresponding to the adjustment point 114a, and then control the printing head 120 to move toward the platform 110 along the normal direction N1 to be in contact with the adjustment point 114a for obtaining the plane coordinate at the adjustment point 114a corresponding to the datum plane $P_L$ and the shortest distance D1 from the adjustment point 114a to the datum plane $P_L$. Next, the control unit 130 again, for example, controls the printing head 120 to move to the position at the datum plane $P_L$ corresponding to the adjustment point 114b, and then to move toward the platform 110 along the normal direction N1 to be in contact with the adjustment point 114b for obtaining the plane coordinate of the adjustment point 114b corresponding to the datum plane $P_L$ and the shortest distance D2 from the adjustment point 114b to the datum plane $P_L$. Then, the control unit 130 again, for example, controls the printing head 120 to move to the position at the datum plane $P_L$ corresponding to the adjustment point 114c, and then to move toward the platform 110 along the normal direction N1 to be in contact with the adjustment point 114c for obtaining the plane coordinate of the adjustment point 114c corresponding to the datum plane $P_L$ and the shortest distance D3 from the adjustment point 114c to the datum plane $P_L$. It should be noted that the amount of the adjustment points 114a, 114b and 114c in the present embodiment is three, so as to define a plane with three points. Certainly, those skilled in the art may arrange needed adjustment points on the platform 110 based on actual requirements, and the amount of the adjustment points of the exemplary embodiment is not limited herein.

Afterwards, the control unit 130 then obtains a coordinate offset value of the carrying surface 112 corresponding to the datum plane $P_L$ according to the plane coordinates and the shortest distances D1, D2 and D3 obtained in the previous step, i.e., a skew offset of the plane coordinate of the carrying surface 112 with respect to the plane coordinate of the datum plane $P_L$. In this way, the control unit 130 may adjust a model coordinate of the digital 3-D model information according to the coordinate offset, and further to move the printing head 120 according to the adjusted model coordinate to print a 3-D object related to the digital 3-D model information on the carrying surface 112. Thus, the printing head 120 can be shifted initially to correct working coordinates according to the adjusted model coordinates, and a yield and a precision in printing 3-D objects would not be affected by deviation of the platform 110. Namely, in the present embodiment, the model coordinate of the digital 3-D model information is compensated according to the coordinate offset value of the carrying surface 112 corresponding to the datum plane $P_L$, so as to compensate the deviation of the platform 110 by adjusting the model coordinate of the digital 3-D model information. As such, in the present embodiment, effects of adjusting the deviation of the platform 110 may be achieved without manually adjusting a level of the platform 110.

Further, in the present embodiment, the printing head 120 and each of the adjustment points 114a, 114b and 114c are suitable for being electrically connected to each other when in contact. For example, each of the adjustment points 114a, 114b and 114c may be a metal adjustment point. Namely, a material of the adjustment points 114a, 114b and 114c located on the carrying surface 112 is metal. Alternatively, in another exemplary embodiment, the platform 110 by itself is a metal platform, while the printing head 120 may include a metal nozzle 122 coupled to a power source 124. When the printing head 120 moves from the datum plane $P_L$ toward the platform 110, the control unit 130 turns on the power source 124 such that the printing head 120 is electrically connected to each of the adjustment points 114a, 114b and 114c when in contact to generate a contact signal accordingly. The control unit 130 is suitable for receiving the contact signal and detecting a position the printing head 120 according to each of the contact signals, so as to obtain the plane coordinates of the adjustment points 114a, 114b and 114c corresponding to the datum plane $P_L$ and the shortest distances D1, D2 and D3 from the adjustment points 114a, 114b and 114c to the datum plane $P_L$.

Figure 3B:
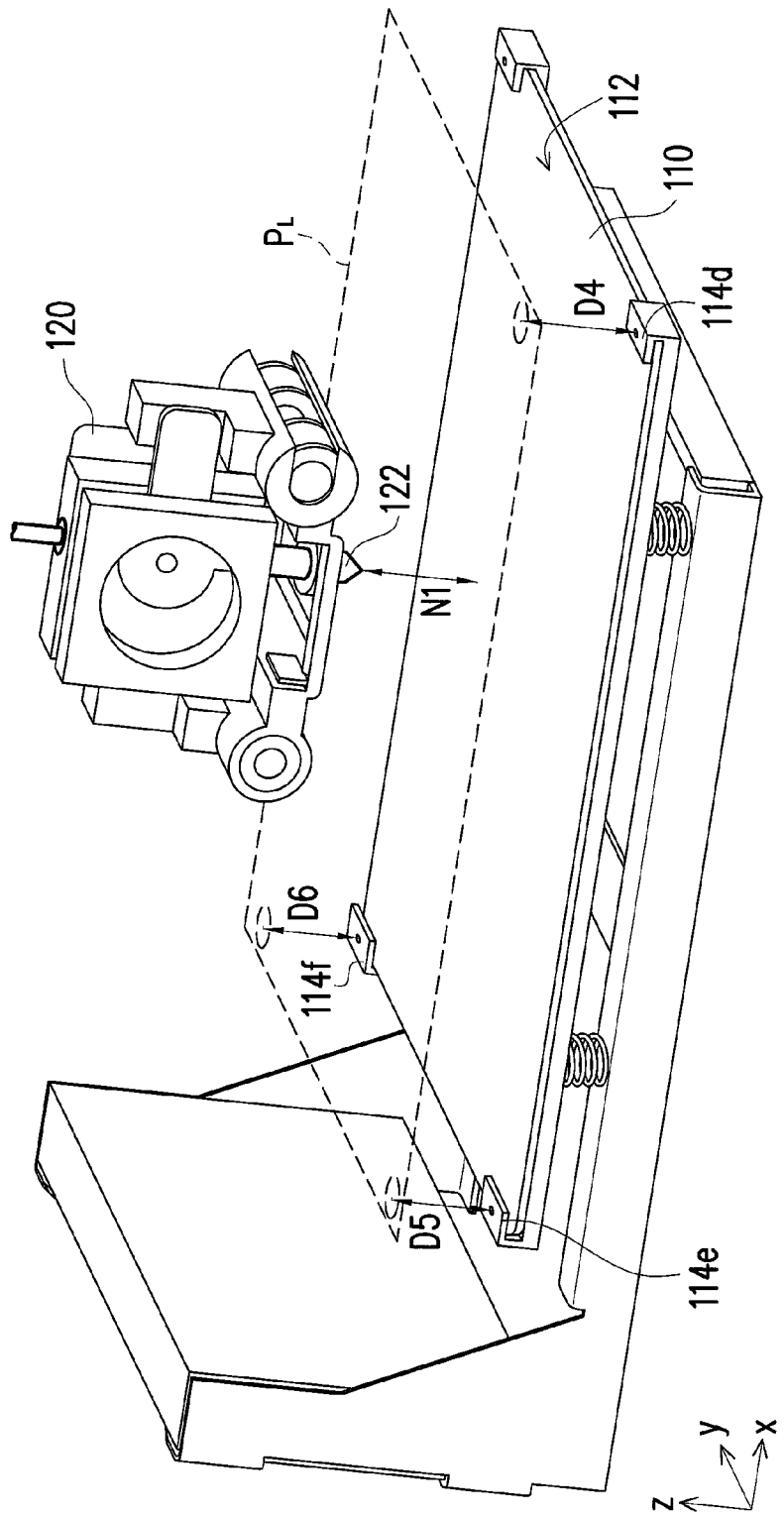
FIG. 3B is a schematic diagram illustrating a 3-D printer according to another exemplary embodiment.
Figure 4:
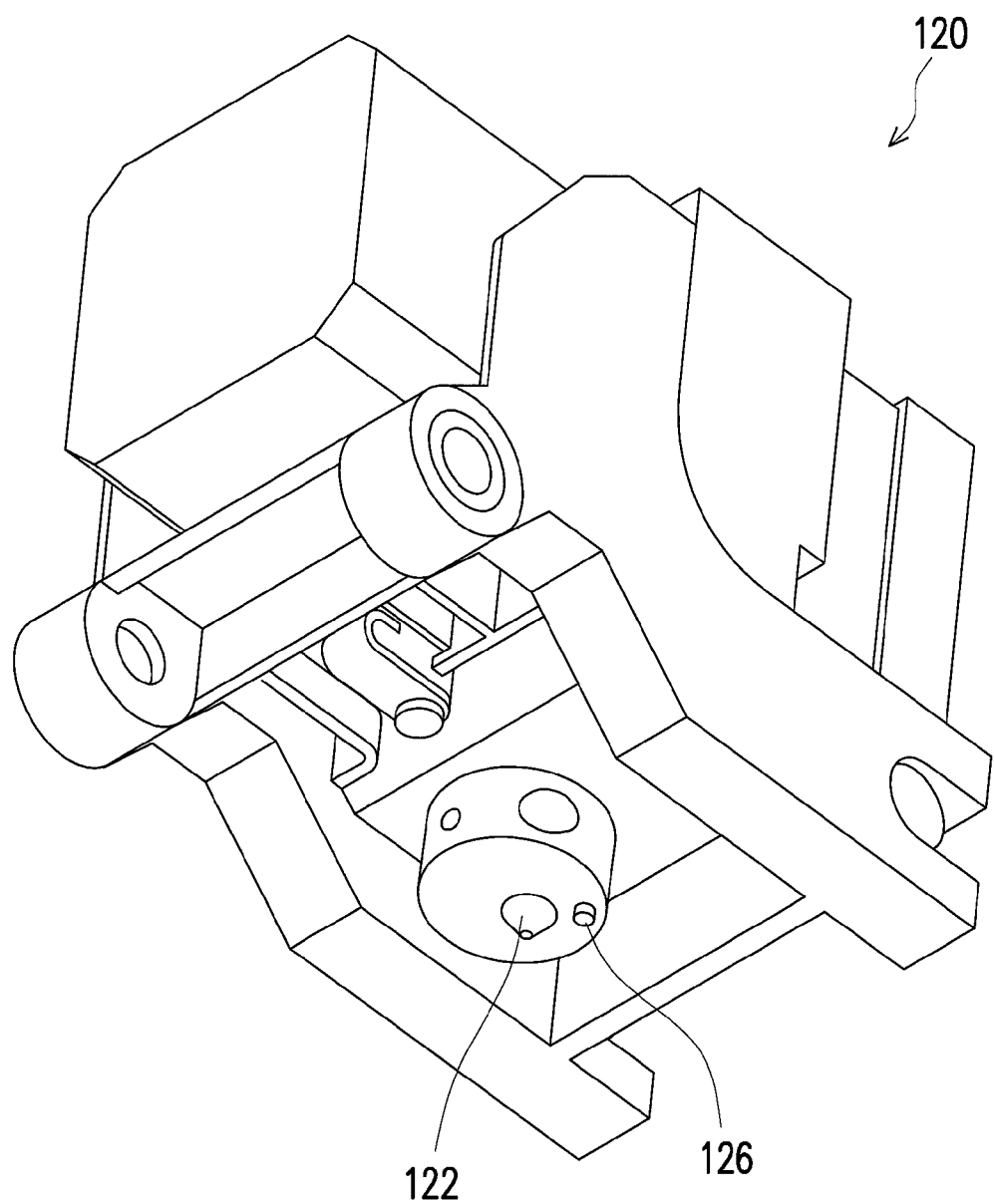
FIG. 4 is a schematic diagram illustrating the printing head of the 3-D printer depicted in FIG. 3B.
Figure 5:
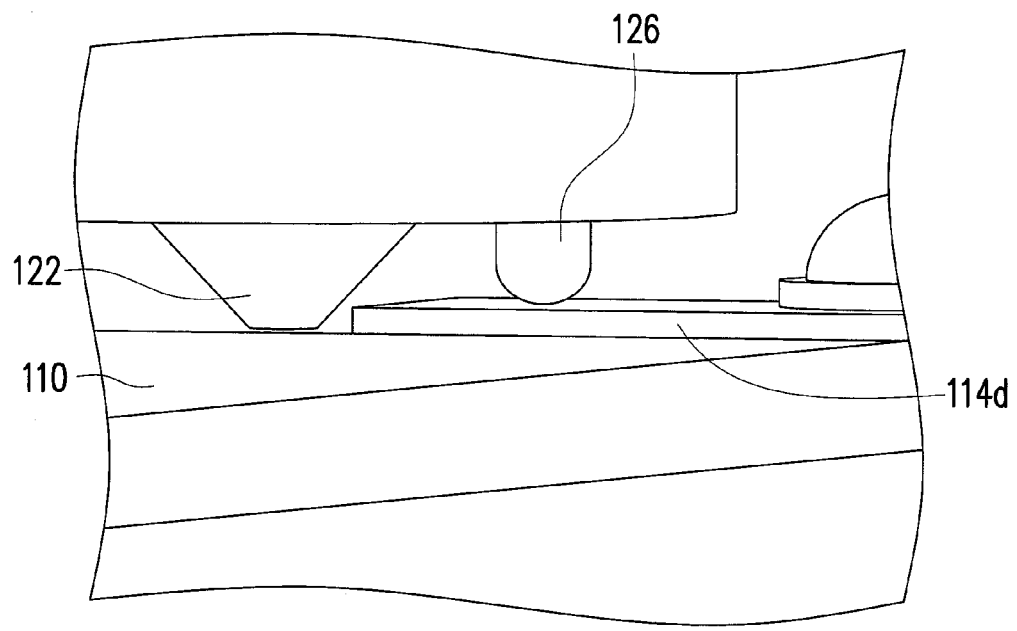
FIG. 5 is a schematic diagram illustrating the printing head being in contact with the adjustment point depicted in FIG. 4.

FIG. 3B is a schematic diagram illustrating a 3-D printer according to another exemplary embodiment. FIG. 4 is a schematic diagram illustrating the printing head of the 3-D printer depicted in FIG. 3B. FIG. 5 is a schematic diagram illustrating the printing head being in contacted with the adjustment point depicted in FIG. 4. It should be noted that the 3-D printer of the present embodiment is similar to the 3-D printer depicted in FIG. 3A. Thus, the present embodiment adopts the reference numerals and parts of the contents of the aforesaid embodiment, wherein same reference numerals are adopted to represent the same or similar elements, and repetitive explanations of the same technical content is omitted. Concerning the omitted illustrations, please refer to the aforesaid embodiment. The same technical contents are not reiterated in the present embodiment. The difference between the present embodiment and the aforesaid embodiment will be demonstrated as follows.

With reference to FIG. 3B to FIG. 5, in the present embodiment, adjustment points 114d, 114e and 114f may be a plurality of metal gaskets 114d, 114e and 114f illustrated in FIG. 3B, and are configured for clamping the platform 110 and being located on the carrying surface 112. As shown in FIG. 3, top surfaces of the metal gaskets 114d, 114e and 114f are higher than the carrying surface 112. In this case, the platform 110 may be a glass platform or a platform made of other insulating materials. Certainly, the disclosure is not limited herein. As shown in FIG. 4, the printing head 120 includes a metal nozzle 122 and a metal adjustment probe 126. The metal adjustment probe 126 may be coupled to the power source 124. When the control unit 130 controls the printing head 120 to move from positions of the datum plane $P_L$ corresponding to the adjustment points 114d, 114e and 114f toward the platform 110 along the normal direction N1, the control unit 130 turns on the power source 124 such that the metal adjustment probe 126 is electrically connected to each of the adjustment points 114d, 114e and 114f when in contact so as to generate a contact signal accordingly. The control unit 130 then receives the contact signal and detects positions of the metal adjustment probe 126 according to the contact signals respectively, so as to obtain plane coordinates of the adjustment points 114d, 114e and 114f corresponding to the datum plane $P_L$ and shortest distances D4, D5 and D6 from the adjustment points 114d, 114e and 114f to the datum plane $P_L$.

Figure 6:
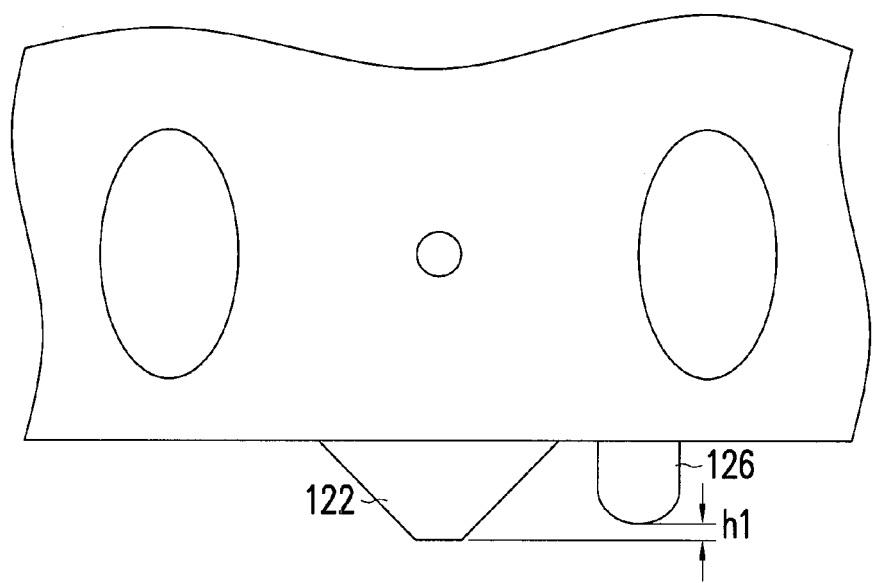
FIG. 6 is a schematic partial enlarged diagram illustrating the printing head depicted in FIG. 4.

FIG. 6 is a schematic partial enlarged diagram illustrating the printing head depicted in FIG. 4. With reference to FIG. 5 and FIG. 6, the metal adjustment probe 126 of the present embodiment is arranged at a periphery of the metal nozzle 122. In addition, a height difference h1 exists between an apex of the metal adjustment probe 126 and an apex of the metal nozzle 122, such that the metal adjustment probe 126 and the metal nozzle 122 do not interfere with each other when performing their own tasks. That is to say, when the 3-D printer adjusts a level of the platform 110, the metal adjustment probe 126 of the printing head 120 is used for performing adjustment, and when the 3-D printer is performing a printing task, a thermal melting material is dispensed by the metal nozzle 122 of the printing head 120 onto the carrying surface 112 so as to print out a 3-D object. When the printing head 120 moves from the datum plane $P_L$ toward the platform 110 to be in contact with each of the adjustment points 114d, 114e and 114f, the metal nozzle 122 would not touch the carrying surface 112 to interfere an adjustment of the platform 110; when the metal nozzle 122 prints a 3-D object, the metal adjustment probe 126 would not touch the carrying surface 112, either, to interfere a 3-D printing process.

Figure 7:
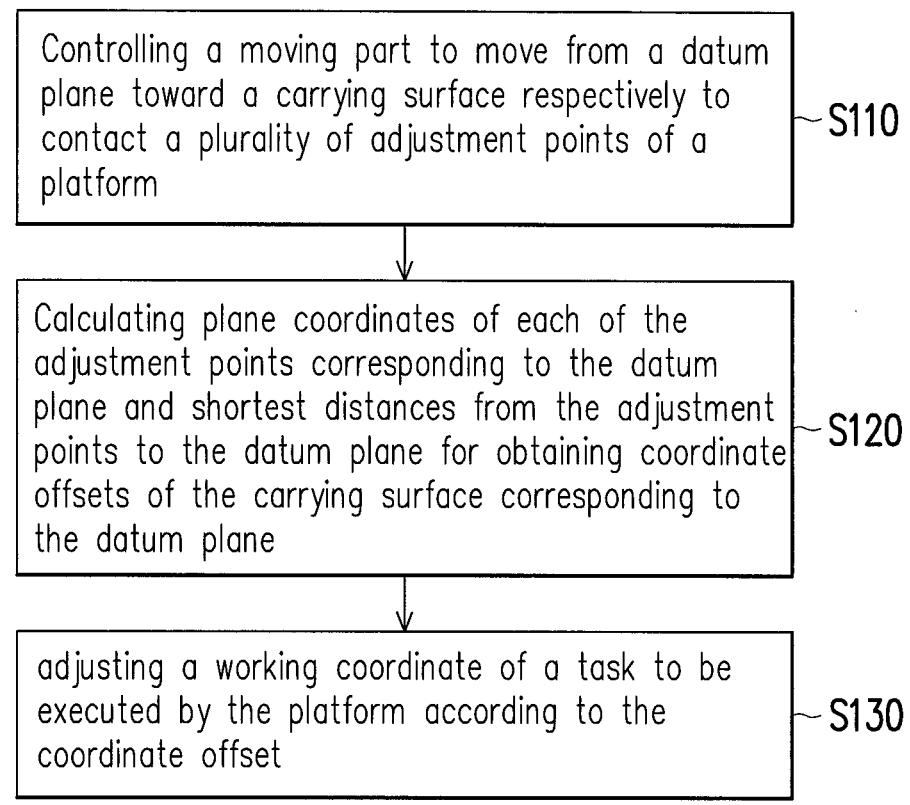
FIG. 7 is a schematic flow chart illustrating a method for adjusting a working coordinate of a platform according to an exemplary embodiment.

FIG. 7 is a schematic flow chart illustrating a method for adjusting a working coordinate of a platform according to an exemplary embodiment. A method for adjusting a working coordinate of a platform may be derived according to the 3-D printer 100 according to the previous embodiment. The adjusting method of the present embodiment may be suitable for the platform 110 including the carrying surface 112 and the plurality of adjustment points. In addition, as shown in FIG. 3A, the adjustment points may be the metal adjustment points 114a, 114b and 114c located on the carrying surface 112. Alternatively, as shown in FIG. 3B, the adjustment points may be the plurality of metal gaskets 114d, 114e and 114f for clamping the platform 110 respectively and located on the carrying surface 112. As shown in FIG. 3, the top surfaces of the metal gaskets 114d, 114e and 114f are higher than the carrying surface 112. It should be noted that the platform 110 using the adjustment method in the present embodiment may be deemed as the platform 110 of the 3-D printer 100 as shown in FIG. 3A and FIG. 3B, and may also be deemed as any platform having a level of the carrying surface 112 that is to be adjusted. Same or similar reference numerals used in the present embodiment represent the same or similar elements.

The method for adjusting a working coordinate of the platform 110 of the present embodiment includes the following steps: first of all, controlling a moving part 120 to move from the datum plane $P_L$ toward the carrying surface 112 respectively to be in contact with adjustment points (Step S110). Specifically, the moving part 120 may be disposed above the platform 110 and is configured to move along the datum plane $P_L$, and is suitable for moving along the normal direction N1 of the datum plane $P_L$. The present embodiment may, for example, control the moving part 120 via a control unit to move from positions of the datum plane $P_L$ corresponding to the adjustment points toward the platform 110 along the normal direction N1 to be in contact with the adjustment points respectively. Take the embodiment depicted in FIG. 3A for example, the control unit may, for example, control the moving part 120 first to move from the position at the datum plane $P_L$ corresponding to the adjustment point 114a before moving toward a direction close to the platform 110 to be in contact with the adjustment point 114a. Next, the moving part 120 is then controlled to move to the position at the datum plane $P_L$ corresponding to the adjustment point 114b before the moving part 120 is controlled to move toward the platform 110, so as to be in contact with the adjustment point 114b. Next, the moving part 120 is then controlled to move to the position at the datum plane $P_L$ corresponding to the adjustment point 114c before the moving part 120 is controlled to move toward the platform 110 so as to be in contact with the adjustment point 114c. The aforesaid steps are repeated until the moving part 120 is moved from the datum plane $P_L$ toward the platform 110 respectively until the moving part 120 is in contact with each of the adjustment points.

In view of the foregoing, the moving part 120 and each of the adjustment points of the present embodiment may be electrically connected to each other when in contact to generate a contact signal. The control unit is suitable for receiving the contact signal and positioning the moving part 120 according the contact signal. In this way, the plane coordinates of the adjustment points corresponding to the datum plane $P_L$ respectively and the shortest distances D1, D2 and D3 from the adjustment points 114a, 114b and 114c to the datum plane $P_L$ respectively may be calculated, and a coordinate offset of the carrying surface 112 corresponding to datum plane $P_L$ is obtained according to the plane coordinates and the shortest distances D1, D2 and D3 (Step S120). Specifically, the control unit may, as previously described, control the moving part 120 to move first to the position at the datum plane $P_L$ corresponding to the adjustment point 114a toward the platform 110 to be in contact with the adjustment point 114a, so as to calculate the plane coordinate of the adjustment point 114a corresponding to the datum plane $P_L$ and the shortest distance D1 from the adjustment point 114a to the datum plane $P_L$. Next, the moving part 120 is then controlled to move to the position at the datum plane $P_L$ corresponding to the adjustment point 114b, and then the moving part 120 is controlled to move toward the platform 110 to be in contact with the adjustment point 114b, so as to calculate the plane coordinate of the adjustment point 114b corresponding to the datum plane $P_L$ and the shortest distance D2 from the adjustment point 114b to the datum plane $P_L$. Later, the moving part 120 is then controlled to move to the position at the datum plane $P_L$ corresponding to the adjustment point 114c, and then the moving part 120 is controlled to move toward the platform 110 to be in contact with the adjustment point 114c, so as to calculate the plane coordinate of the adjustment point 114c corresponding to the datum plane $P_L$ and the shortest distance D3 from the adjustment point 114c to the datum plane $P_L$. Afterwards, a coordinate offsets of the carrying surface 112 corresponding to the datum plane $P_L$ is obtained according to the plane coordinates and the shortest distances D1, D2 and D3 obtained from the previous calculation, i.e., skew offsets of the plane coordinates of the carrying surface 112 with respect to the plane coordinates of the datum plane $P_L$.

Thereafter, a working coordinate of a task to be executed by the platform 110 is adjusted according to the coordinate offsets (Step S130). That is to say, after the control unit obtains the skew offset of the plane coordinate of the carrying surface 112 with respect to the plane coordinate of the datum plane $P_L$, the control unit may compensate and adjust a predetermined working coordinate of a task to be executed by the platform 110 later on according to the coordinate offset, such that the moving part 120 may be moved to correct working coordinates for executing a task according to the adjusted working coordinate, and an yield and a precision in execution of the task to be executed would not be affected by deviation of the platform 110.

To sum up, the 3-D printer of the exemplary embodiment is suitable for printing a 3-D object according to a digital 3-D model information, and the 3-D printer would first control a printing head thereof to move from a datum plane toward a platform respectively to be in contact with a plurality of adjustment points on the platform prior to executing a printing task, so as to obtain a coordinate offset of the carrying surface of the platform corresponding to the datum surface, and to adjust a model coordinate of the digital 3-D model information according to the coordinate offset, such that the printing head is moved according to the adjusted model coordinate to print out the 3-D object on the carrying surface. In this way, the printing head may be moved to correct working coordinates according to the adjusted model coordinates, and a yield and a precision in printing 3-D objects would not be affected by deviation of the platform. Namely, in the disclosure, the model coordinates of the digital 3-D model information are adjusted accordingly by calculating the coordinate offsets of the carrying surface corresponding to the datum plane, so as to compensate the deviation of the platform. As such, in an exemplary example, effects of adjusting the deviation of the platform may be achieved without manually adjusting the level of the platform.

Moreover, in an exemplary example, a method for adjusting a working coordinate of a platform is further derived. The method executes a task by first controlling a moving part to move from a datum plane toward a platform respectively to be in contact with a plurality of adjustment points on the platform for obtaining a coordinate offset of the carrying surface of the platform corresponding to the datum plane, and then adjusting a working coordinate of the task to be executed by the platform according to the coordinate offset. In this way, with the adjusting method in an exemplary example, the moving part may execute the task by moving to correct working coordinates according to the adjusted model coordinates without manually adjusting the level of the platform, and a yield and a precision in executing a task would not be affected by deviation of the platform.

Although the disclosure has been disclosed with reference to the aforesaid embodiments, they are not intended to limit the disclosure. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A three-dimensional (3-D) printer, comprising:
 a platform comprising a carrying surface and a plurality of adjustment points, the adjustment points located on the carrying surface;

a printing head disposed above the platform, the printing head configured to move along a datum plane and a normal direction of the datum plane; and a control unit coupled to the platform and the printing head, the control unit controlling the printing head to move from the datum plane toward the platform to be in contact with the adjustment points respectively for obtaining a plane coordinate of each of the adjustment points corresponding to the datum plane and a shortest distance from each of the adjustment points to the datum plane, and obtaining a coordinate offset value of the carrying surface corresponding to the datum plane according to the plane coordinates and the shortest distances, and adjusting a model coordinate of a digital 3-D model information according to the coordinate offset value, such that the control unit moving the printing head according to the adjusted model coordinate to print a 3-D object related to the digital 3-D model info illation on the carrying surface.

2. The 3-D printer as claimed in claim 1, wherein the control unit controls the printing head to move, respectively, along a normal direction of the datum plane from positions at the datum plane corresponding to the adjustment points toward the platform to be in contact with the adjustment points.

3. The 3-D printer as claimed in claim 1, wherein the printing head and each of the adjustment points are suitable for being electrically connected to each other when in contact, such that the control unit receives a contact signal when the printing head is in contact with each of the adjustment points, and detects the positions of the printing head according to the contact signals respectively for obtaining the plane coordinates and the shortest distances.

4. The 3-D printer as claimed in claim 3, wherein each of the adjustment points is a metal adjustment point, and the printing head comprises a metal nozzle.

5. The 3-D printer as claimed in claim 4, wherein the metal nozzle is coupled to a power source, when the printing head moves from the datum plane toward the platform, the control unit turns on the power source.

6. The 3-D printer as claimed in claim 4, wherein, when the printing head moves from the datum plane toward the platform, the metal nozzle is in contact with each of the adjustment points respectively, and the metal nozzle and each of the adjustment points are electrically connected to each other, such that the control unit receives the contact signal when the metal nozzle is in contact with each of the adjustment points.

7. The 3-D printer as claimed in claim 3, wherein the adjustment points are a plurality of metal gaskets for clamping the platform and are located on the carrying surface, the printing head comprises a metal nozzle and a metal adjustment probe, when the printing head moves from the datum plane toward the platform, the metal adjustment probe is in contact with and electrically connected to each of the adjustment points, such that the control unit receives the contact signal when the metal adjustment probe is in contact with each of the adjustment points.

8. The 3-D printer as claimed in claim 7, wherein the metal adjustment probe is disposed at a periphery of the metal nozzle, and a height difference exists between an apex of the metal adjustment probe and an apex of the metal nozzle.

* * * * *